US009966085B2

(12) United States Patent
Song et al.

(10) Patent No.: US 9,966,085 B2
(45) Date of Patent: May 8, 2018

(54) METHOD AND NOISE SUPPRESSION CIRCUIT INCORPORATING A PLURALITY OF NOISE SUPPRESSION TECHNIQUES

(75) Inventors: Jianming J. Song, Barrington, IL (US); Joel A. Clark, Woodridge, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1946 days.

(21) Appl. No.: 11/842,305

(22) Filed: Aug. 21, 2007

(65) Prior Publication Data

US 2008/0159560 A1  Jul. 3, 2008

Related U.S. Application Data

(60) Provisional application No. 60/882,926, filed on Dec. 30, 2006.

(51) Int. Cl.
*H04B 15/00* (2006.01)
*G10L 15/20* (2006.01)
(Continued)

(52) U.S. Cl.
CPC .......... *G10L 21/0208* (2013.01); *G10L 25/78* (2013.01); *G10L 15/142* (2013.01);
(Continued)

(58) Field of Classification Search
CPC ..... G10L 21/0208; G10L 25/78; G10L 21/02; G10L 21/00; G10L 19/00; G10L 15/20;
(Continued)

(56) References Cited

U.S. PATENT DOCUMENTS 5,097,510 A * 3/1992 Graupe .......................... 704/233
5,479,474 A * 12/1995 Schwartzman et al. ...... 455/570
(Continued)

FOREIGN PATENT DOCUMENTS

WO   WO 02095730 A1 * 11/2002 ............. G10L 15/20

OTHER PUBLICATIONS

Yamauchi et al, Spectral Subtraction with Non-Stationary Noise Estimation Utilizing Harmonic Structure, WSEAS, 2005.*
(Continued)

*Primary Examiner* — Davetta W Goins
*Assistant Examiner* — Kuassi Ganmavo
(74) *Attorney, Agent, or Firm* — Morris & Kamlay LLP

(57) ABSTRACT

A noise suppression circuit for use in an audio signal processing circuit is provided. The noise suppression circuit includes a plurality of different types of noise activity detectors, which are each adapted for detecting the presence of a different type of noise in a received signal. The noise suppression circuit further includes a plurality of different types of noise reduction circuits, which are each adapted for removing a different type of detected noise, where each noise reduction circuit respectively corresponds to one of the plurality of noise activity detectors. The respective noise reduction circuit is then selectively activated to condition the received signal to reduce the amount of the detected types of noise, when each one of the plurality of noise activity detectors detects the presence of a corresponding type of noise in the received signal.

14 Claims, 4 Drawing Sheets

(51) Int. Cl.

| | |
|---|---|
| *H04M 1/00* | (2006.01) |
| *G10L 21/0208* | (2013.01) |
| *G10L 25/78* | (2013.01) |
| *G10L 21/02* | (2013.01) |
| *G10L 19/02* | (2013.01) |
| *G10L 21/00* | (2013.01) |
| *G10L 15/14* | (2006.01) |
| *G10L 21/0232* | (2013.01) |
| *G10L 19/00* | (2013.01) |

(52) U.S. Cl.
CPC .............. *G10L 15/20* (2013.01); *G10L 19/00* (2013.01); *G10L 19/0204* (2013.01); *G10L 21/00* (2013.01); *G10L 21/02* (2013.01); *G10L 21/0232* (2013.01)

(58) Field of Classification Search
CPC .............. G10L 19/0204; G10L 15/142; G10L 21/0232
USPC .. 381/56, 57, 58, 59, 301, 74, 332, 333, 92, 381/104, 336; 704/233, 226, 243
See application file for complete search history.

(56) References Cited

U.S. PATENT DOCUMENTS

| | | | | |
|---|---|---|---|---|
| 5,933,495 | A * | 8/1999 | Oh .......................... | 379/406.08 |
| 6,148,078 | A | 11/2000 | Romesburg | |
| 6,163,608 | A | 12/2000 | Romesburg et al. | |
| 6,320,918 | B1 * | 11/2001 | Walker ............... | G10L 21/0208 375/285 |
| 6,424,938 | B1 * | 7/2002 | Johansson ............... | G10L 25/78 704/216 |
| 6,662,160 | B1 * | 12/2003 | Chien et al. .................. | 704/256 |
| 6,760,435 | B1 * | 7/2004 | Etter et al. ............... | 379/406.01 |
| 7,065,487 | B2 * | 6/2006 | Miyazawa ..................... | 704/233 |
| 7,318,030 | B2 * | 1/2008 | Guduru .......................... | 704/243 |
| 7,693,293 | B2 * | 4/2010 | Nemoto et al. ............... | 381/94.5 |
| 7,725,314 | B2 * | 5/2010 | Wu et al. ....................... | 704/233 |
| 7,787,956 | B2 * | 8/2010 | Grayden et al. ................ | 607/57 |
| 7,873,114 | B2 * | 1/2011 | Lin ................ | 375/285 |
| 2001/0019633 | A1 * | 9/2001 | Tenze ....................... | G06K 9/40 382/261 |
| 2002/0165713 | A1 | 11/2002 | Skoglund et al. | |
| 2002/0191804 | A1 * | 12/2002 | Luo et al. ..................... | 381/312 |
| 2005/0060149 | A1 | 3/2005 | Guduru | |
| 2005/0182624 | A1 | 8/2005 | Wu et al. | |
| 2005/0240401 | A1 * | 10/2005 | Ebenezer ...................... | 704/226 |
| 2006/0074640 | A1 * | 4/2006 | Kim ............................ | 704/208 |
| 2006/0074646 | A1 * | 4/2006 | Alves .................. | G10L 21/0208 704/226 |

OTHER PUBLICATIONS

Elberling et al, The Design and testing of a noise reduction algorithm based on spectral subtraction, 1993.*
Nomura et al, Musical Noise Reduction by Spectral Subtraction Using Morphological Filter,RISP,2005.*
European Search Report and Written Opinion in EP2100295, completed Dec. 23, 2011.
First Examination Report of 2214/KOLNP/2009 dated Jul. 21, 2014.
Yamada, et al., "Integration of Noise Reduction Algorithms for Aurora2 Task", Sep. 1, 2003 (Sep. 1, 2003).

* cited by examiner

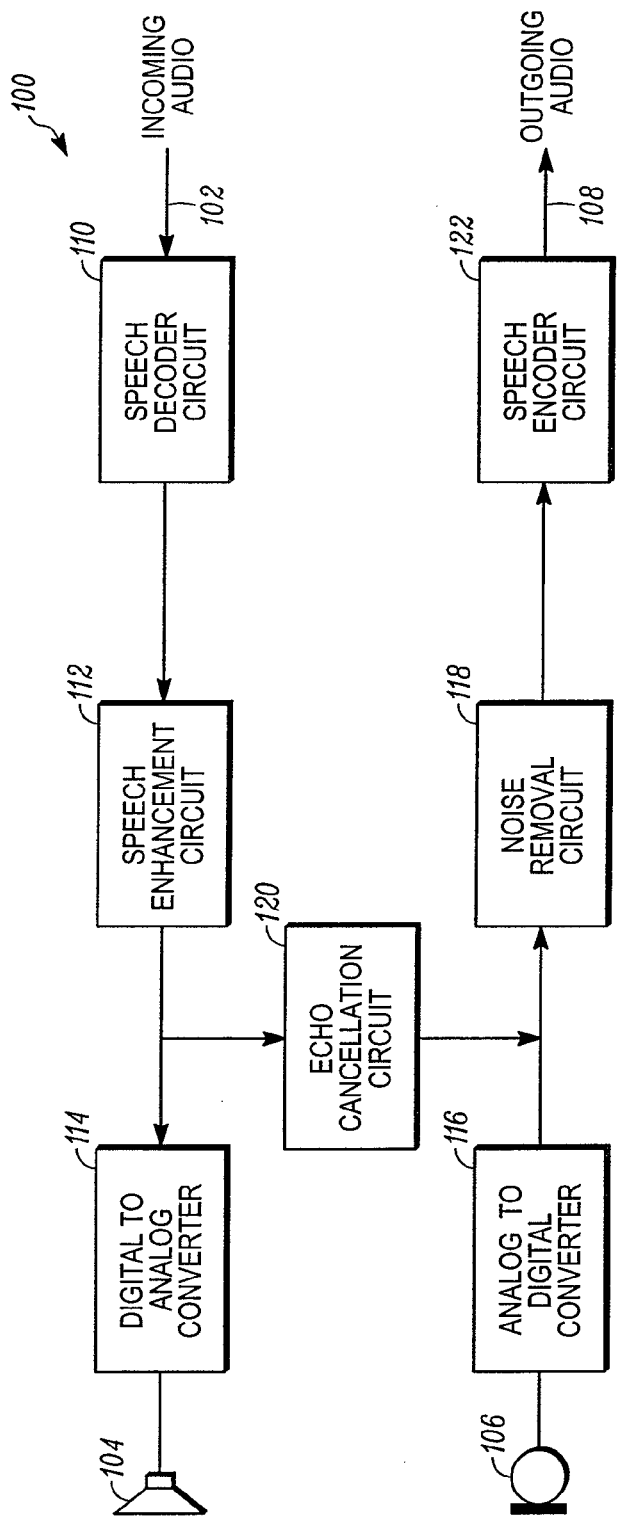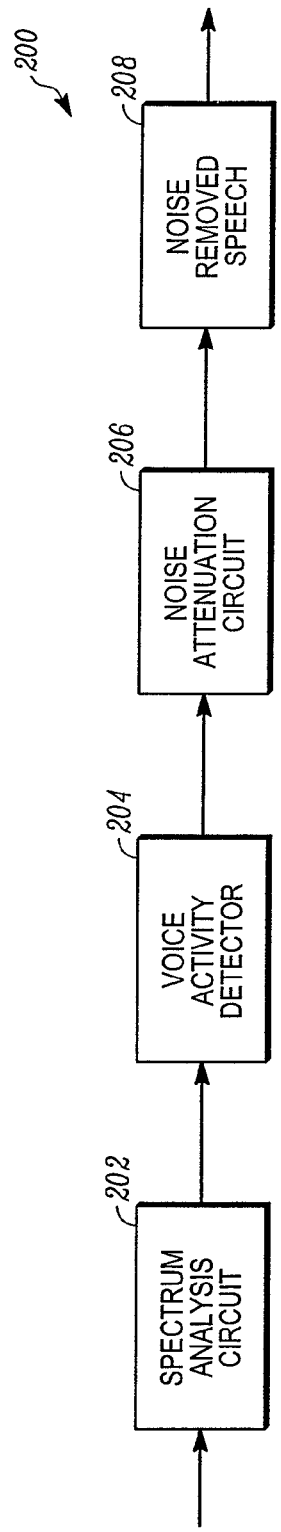
FIG. 1
FIG. 2

METHOD AND NOISE SUPPRESSION CIRCUIT INCORPORATING A PLURALITY OF NOISE SUPPRESSION TECHNIQUES

CROSS REFERENCE TO RELATED APPLICATIONS

This application claims priority from a U.S. Provisional Patent Application Ser. No. 60/882,926, filed Dec. 30, 2006.

FIELD OF THE INVENTION

The present invention relates generally to a noise suppression circuitry and corresponding methods, and more particularly, to a method and noise suppression circuit incorporating multiple noise suppression techniques including a detector for detecting multiple types of noise and multiple corresponding techniques for removing the detected noise.

BACKGROUND OF THE INVENTION

The presence of ambient or background noise can have a significant effect on the quality of audio experienced by one or both of the participants of a call, especially if one or both of the participants are in a noisy environment. With respect to audio quality, voice clarity and intelligibility are generally more prominent concerns. However, when speaking in a noisy environment, filtering out ambient noise that can sometimes be picked up by a microphone in addition to the user's voice can often times present many challenges. This can be especially true where the ambient noise might consist of many people talking in the background, often referred to as babble noise. This is because the background voices have characteristics that are similar to the desired speech signals being produced by the user, and therefore can be more difficult to distinguish and detect.

While historically, people have sometimes sought a quiet environment to talk on the phone, which attempted to mitigate the problems of any background noises by avoiding them altogether, a quiet environment such as a phone booth is not always conveniently available, and the need for a quiet environment can sometimes negatively impact the mobility and convenience associated with using a mobile telephone and/or a phone coupled to a landline in an environment that is only sometimes noisy.

More recently, attempts to reduce background noise and improve speech-to-noise ratios have largely focused on ambient noise that is fairly stationary, and/or is noise associated with known sources, such as engine noise from a car. Some of these approaches have attempted to focus on the time periods during which a person's voice is detected as not being currently present, and attempting to mitigate noise during these periods. However, attempts to address non-stationary types of noise, such as babble noise has proved to be more problematic. Many of the more recent attempts have attempted to apply techniques based upon a more instantaneous acoustic analysis, which apply relatively static models, which are generally not effective for less stationary type noises. Furthermore, the techniques associated with addressing instances in which the intended speech is not present, are not very effective in removing noise, which is overlapped with the intended speech.

Consequently, the present inventors have recognized that it would be desirable to be able to distinguish between different types of noise from the intended speech, such as babble noise and/or stationary noise, and be able to implement techniques selectively applied and specifically tailored to address each type of noise, when the same is detected as being present, while at the same time avoiding and/or mitigating the effects of any unpleasant audible artifacts.

SUMMARY OF THE INVENTION

The present invention provides a noise suppression circuit for use in an audio signal processing circuit. The noise suppression circuit includes a plurality of different types of noise activity detectors, which are each adapted for detecting the presence of a different type of noise in a received signal. The noise suppression circuit further includes a plurality of different types of noise reduction circuits, which are each adapted for removing a different type of detected noise, where each noise reduction circuit respectively corresponds to one of the plurality of noise activity detectors. The respective noise reduction circuit is then selectively activated to condition the received signal to reduce the amount of the detected types of noise, when each one of the plurality of noise activity detectors detects the presence of a corresponding type of noise in the received signal.

In at least one embodiment, the plurality of different types of noise activity detectors include a babble noise activity detector and a stationary noise activity detector.

The present invention further provides a two way communication device, which includes a transceiver for communicating with a remote radio source, a speaker for reproducing an audio signal received from a remote radio source, a microphone for detecting an audio signal to be transmitted to the remote radio source, and an audio signal processing circuit including a noise suppression circuit for conditioning the audio signal detected by the microphone prior to being transmitted to the remote radio source by the transceiver. The noise suppression circuit includes a plurality of different types of noise activity detectors, which are each adapted for detecting the presence of a different type of noise in a received signal. The noise suppression circuit further includes a plurality of different types of noise reduction circuits, which are each adapted for removing a different type of detected noise, where each noise reduction circuit respectively corresponds to one of the plurality of noise activity detectors. The respective noise reduction circuit is then selectively activated to condition the received signal to reduce the amount of the detected types of noise, when each one of the plurality of noise activity detectors detects the presence of a corresponding type of noise in the received signal.

The present invention further provides a method for suppressing noise in an audio signal. The method includes detecting with a plurality of different types of noise activity detectors the presence of a plurality of different types of noise in the audio signal, each different type of noise activity detector being adapted to detect a different type of noise. The detected type of noise in the audio signal is then suppressed using one of a plurality of different types of noise reduction circuits each adapted for removing a different type of detected noise, where each noise reduction circuit respectively corresponds to one of the plurality of noise activity detectors, when the respective detector detects the presence of the corresponding type of noise by selectively activating the respective noise reduction circuit.

These and other features, and advantages of this invention are evident from the following description of one or more preferred embodiments of this invention, with reference to the accompanying drawings.

BRIEF DESCRIPTION OF THE DRAWINGS

FIG. 1 is a block diagram of an exemplary audio signal processing circuit;

FIG. 2 is a block diagram of a noise removal circuit, associated with at least one exemplary prior technique;

DETAILED DESCRIPTION OF THE PREFERRED EMBODIMENT(S)

Figure 3:
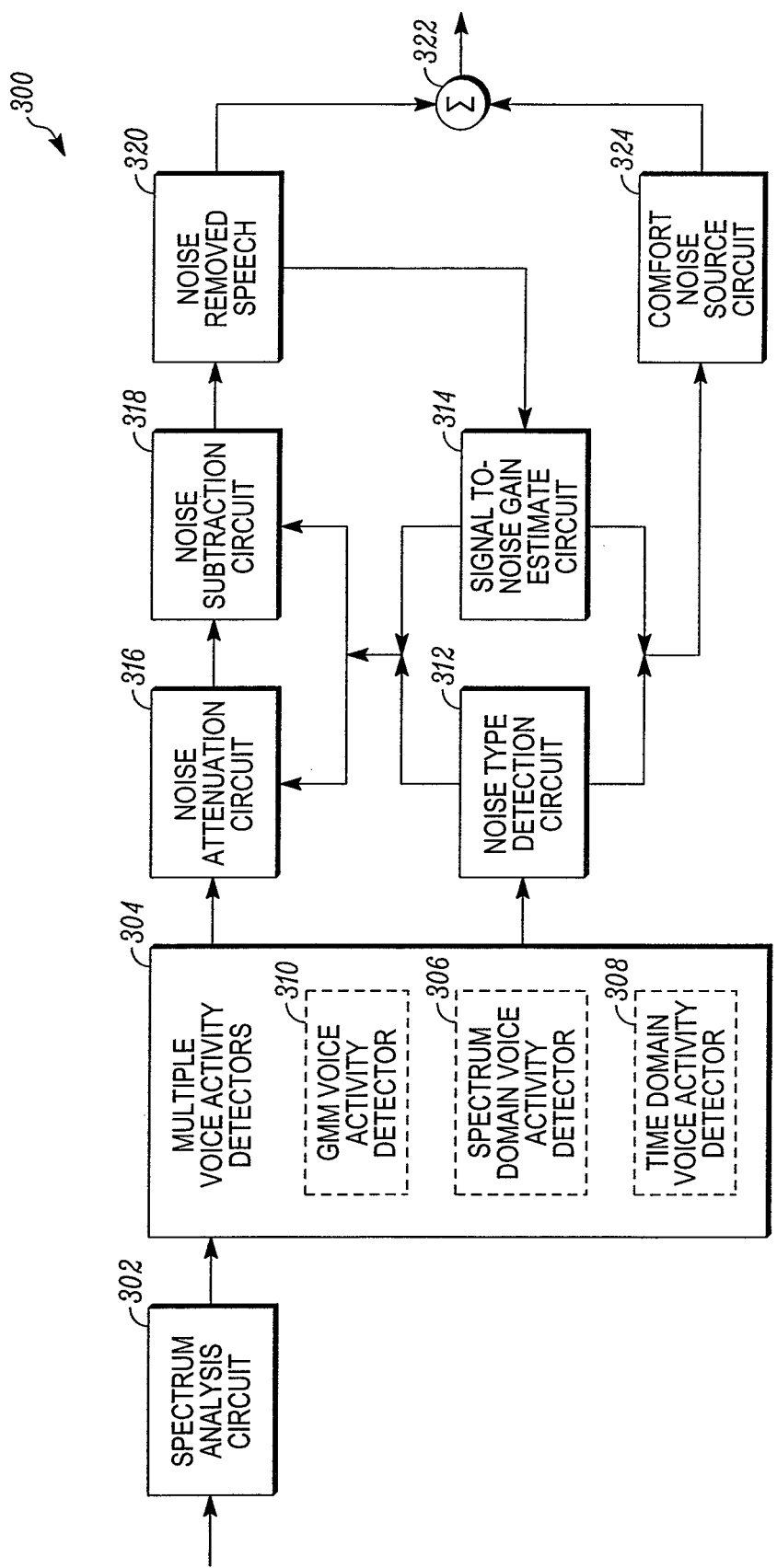
FIG. 3 is a block diagram of a noise suppression circuit, in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of an exemplary audio signal processing circuit 100. The audio signal processing circuit 100 includes a first path directed to receiving an incoming audio data stream 102 and reproducing the corresponding audio signal at a speaker 104, and a second path directed to receiving an audio signal at a microphone 106 and converting the audio signal received at the microphone 106 into an outgoing audio data stream 108.

The first path includes a speech decoder circuit 110, which receives the incoming audio data stream 102 which can be encoded as data packets suitable for transmission via a wireless radio frequency communication interface, and recombines the received data packets and converts the same into digital speech data. The digital speech data, is then received by a speech enhancement circuit 112, which performs any necessary error correction or data enhancement in the audio data as a result of errors during the data transmission and/or any missing data packets. The enhanced or corrected data stream is then converted from a digital signal to an analog signal via a digital to analog converter 114 and conveyed to a speaker 104 for reproduction of the audio signal to be heard by the user.

The second path includes the microphone 106, which detects an audio signal including any voice signals being produced by the user, as well as any background noise. The detected audio signal is then converted by an analog to digital converter 116 from an analog audio signal produced by the microphone 106 to a digitally encoded audio signal. The digitally encoded audio signal is then received by a noise removal circuit 118, which attempts to detect the presence of noise and attempts to remove the same.

As part of detecting the presence of noise and attempts to remove the same, in at least some instances, an echo cancellation circuit 120 coupled to the output of the speech enhancement circuit 112 of the first path provides to the noise removal circuit 118 a representation of the audio signal being conveyed to the speaker 104 to be produced as an audio signal. This in turn enables the noise removal circuit 118 to recognize any audio signal produced at the speaker 104, which may have been subsequently detected by the microphone 106, and which has then been incorporated into the audio signal detected by the microphone 106. The received representation from the echo cancellation circuit 120 can then be used to remove the same from the audio signal detected by the microphone 106.

The resulting audio signal with noise removed, which is produced by the noise removal circuit 118, is then coupled to a speech encoder circuit 122, which takes the audio signal received from the noise removal circuit 118 and encodes the audio signal into data packets forming an outgoing audio signal, which is suitable for transmission via a wireless radio frequency communication interface.

FIG. 2 illustrates a block diagram of a noise removal circuit 200, associated with at least one exemplary prior technique. The noise removal circuit 200 includes a spectrum analysis circuit 202, which analyzes the various spectral characteristics of the digitally converted analog signal detected by the microphone 106. The spectral characteristics would then be conveyed to a voice activity detector 204, which would attempt to detect the presence or absence of user speech. In at least some instances, the spectrum analysis circuit 202 can include a fast fourier transfer function and analysis circuit, as well as Bark scale spectrum estimation circuitry and Cepstrum coefficient conversion circuitry.

Generally, the voice activity detector 204, associated with prior techniques, would detect the presence of any relatively stationary type noise, associated with one or more frequencies, such as the noise associated with the engine of a car. A noise attenuation circuit 206, would then apply a level of attenuation proportional to the detected amplitude of the detected stationary noise during the periods of time in which no voice activity has been detected by the voice activity detector 204 (i.e. the signal is comprised primarily of stationary noise). The resulting noise removed speech 208 would then be conveyed to the speech encoder circuit for forming an outgoing audio signal. However, when other types of noise such as non-stationary noise is present, often times the voice activity detector would be unable to distinguish the non-stationary noise from user voice activity, and no noise attenuation would take place.

FIG. 3 illustrates a block diagram of a noise suppression circuit 300, in accordance with at least one embodiment of the present invention. Similar to the noise suppression circuit 200, illustrated in FIG. 2, the noise suppression circuit 300 includes a spectrum analysis circuit 302, which determines the various spectral characteristics of the digitally converted analog signal detected by the microphone 106. The spectral characteristics are then conveyed to multiple voice activity detectors 304, which are generally each directed to detecting a different type of noise. In addition to a spectrum domain voice activity detector 306 and a time domain voice activity detector 308, which separately and/or together are directed to detecting various types of generally stationary type noises, the multiple voice activity detectors 304 additionally includes a Gaussian Mixture Model (GMM) voice activity detector 310.

The Gaussian Mixture Model voice activity detector 310 represents a statistical model based voice activity detector, which is pre-trained using a large quantity of samples of pre-collected babble noise. The statistical model based voice activity detector is generally constructed with a Gaussian Mixture Model, in which the model parameters are estimated via a maximum likelihood training procedure to characterize the babble noise data. A log likelihood score is then calculated, when at least a short segment of detected audio signal is matched against the Gaussian Mixture Model. The score is then smoothed and used to make a decision as to whether babble noise is present during the time period of the corresponding analyzed segment.

The results of the multiple voice activity detectors 304 are then used by a noise type detection circuit 312 (i.e. logic decision circuitry) to determine the presence and the type of any noise. The results of the multiple voice activity detectors 304 are further used by a signal-to-noise gain estimate circuit 314 to estimate an amount of any detected noise. The determination of the presence, the type, and the amount of noise is then used by noise removal circuitry, which in the illustrated embodiment is in the form of a noise attenuation circuit 316 and a noise subtraction circuit 318, to remove noise from the digitally converted analog signal detected by the microphone 106. The noise attenuation circuit 316 is principally involved with the removal of any detected stationary type noises, and the noise subtraction circuit 318 is principally involved with the removal of any detected babble type noises.

More specifically, the noise attenuation circuit 316 attenuates those frequency bands in which the signal-to-noise ratio are low. The noise subtraction circuit 318 subtracts noise components from the signal being processed. Because the noise attenuation circuit 316 works more smoothly in noise only portions of the signal being processed, and the noise subtraction circuit 318 is capable of removing noise overlapped with speech, the combination of the two methods offer a synergistic effect in removing noise more effectively, thereby producing the noise removed speech 320.

Comfort noise is then added to the noise removed speech 320 using an adder circuit 322. The comfort noise is produced by a comfort noise source circuit 324, which determines the type and amount of comfort noise based at least in part on the outputs of the noise type detection circuit 312 and the signal-to-noise gain estimate circuit 314. The comfort noise is intended to mask audible artifacts that may be introduced as part of the noise attenuation and/or noise subtraction. For example, in the absence of added comfort noise, if the degree of noise clearance is not the same over time, one might hear some form of tone noise or noise pumping, together with the intended clean speech. The comfort noise, once appropriately added, is generally perceived much more tolerably than the original noise, such as any babble or stationary noise.

Figure 4:
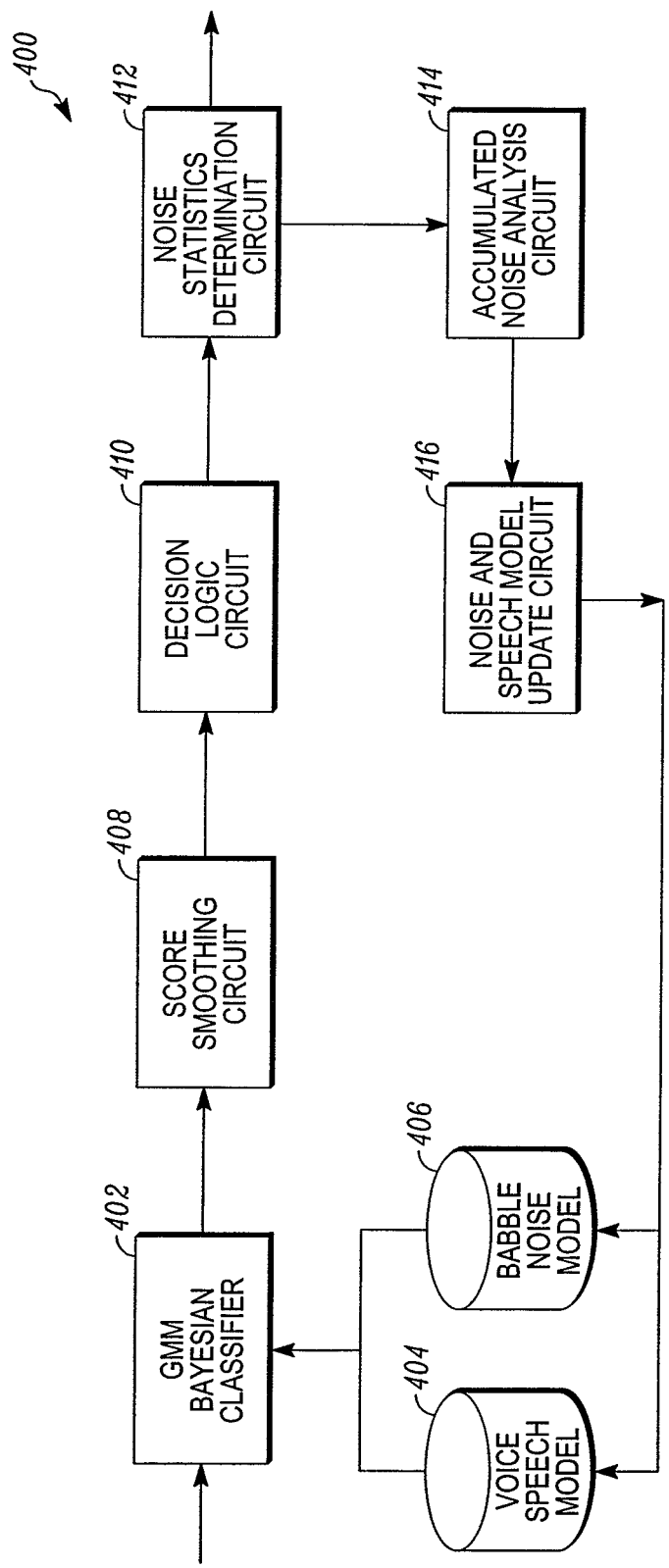
FIG. 4 is a more detailed block diagram illustrating an exemplary Gaussian Mixture Model voice activity detector, of the type illustrated as part of the noise suppression circuit, illustrated in FIG. 3.

FIG. 4 illustrates a more detailed block diagram illustrating an exemplary Gaussian Mixture Model voice activity detector 400, of the type illustrated as part of the noise suppression circuit, illustrated in FIG. 3. The Gaussian Mixture Model voice activity detector 400 includes a Gaussian Mixture Model Bayesian classifier 402, which is coupled to a voice speech model 404 and a babble noise model 406, each including a pattern for one or more types of speech and babble noise, respectively. The Gaussian Mixture Model Bayesian classifier 402 fundamentally behaves as a pattern matching circuit, which in turn produces the above mentioned log likelihood score, based upon the patterns contained in the voice speech model 404 and the babble noise model 406.

The log likelihood score is then smoothed using a score smoothing circuit 408. The smoothed scores are then provided to decision logic circuit 410 to determine the presence, type, and amount of babble noise, if any. Corresponding noise statistics are determined by corresponding circuitry 412, which in turn is used by the noise attenuation and subtraction circuitry 316 and 318.

When babble noise is detected with reasonable confidence, the noise statistics are accumulated by corresponding circuitry 414 and analyzed. The resulting analysis is then used by corresponding circuitry 416 to produce updates for the babble noise model 406, and potentially the voice speech model 404. The updates are intended to keep the babble noise model 406 and the voice speech model 404 fresh, and to adapt the models to more readily detect the types of babble noise that they are more likely to encounter, based upon actual usage experience.

Figure 5:
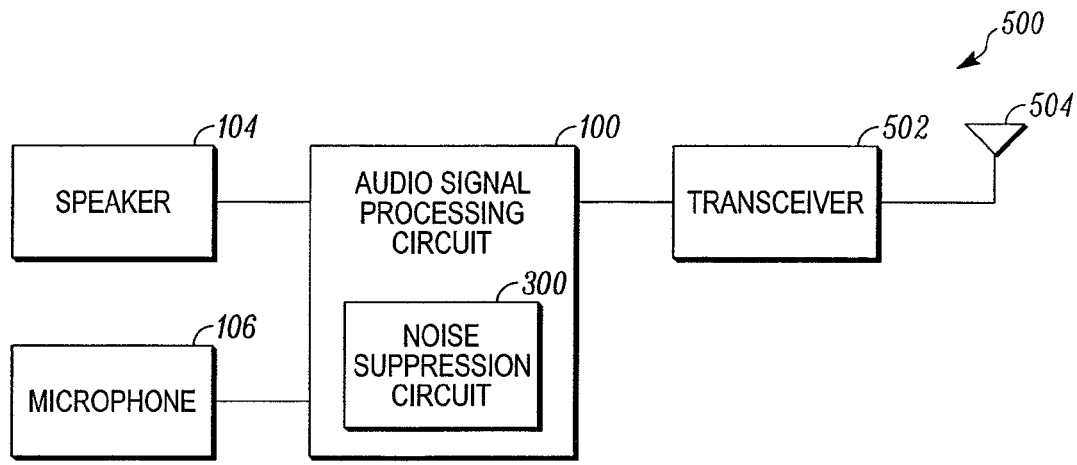
FIG. 5 is a block diagram of an exemplary two way communication device, in which the noise suppression circuit, illustrated in FIG. 3, can be implemented.

FIG. 5 illustrates a block diagram of an exemplary two way communication device 500, in which the noise suppression circuit, illustrated in FIG. 3, can be implemented. In the embodiment illustrated, the two way communication device includes an audio signal processing circuit, which could be of the type illustrated in FIG. 1, and which includes a noise suppression circuit of the type illustrated in FIG. 3. A speaker 104 and a microphone 106 are coupled to the audio signal processing circuit 100, to convert between user producible and detectible audio signals and a representation of the same in the form of an electric signal. The audio signal processing circuit 100 is adapted to receive and produce an audio data stream which is encoded as data packets suitable for transmission via a wireless radio frequency communication interface. The audio signal processing circuit 100 is coupled to a transceiver 502, which in turn is coupled to an antenna 504, which together are capable of communicating with a remote radio source.

While the noise suppression circuit 300 is specifically shown as being capable of being implemented as part of a two way wireless communication device, one skilled in the art will readily appreciate that the noise suppression circuit 300 could alternatively be used in connection with any type of device that is capable of receiving an audio signal, especially where the audio signal may have at least an intended portion and an unintended portion (i.e. noise), which might be detected with the intended portion.

Figure 6:
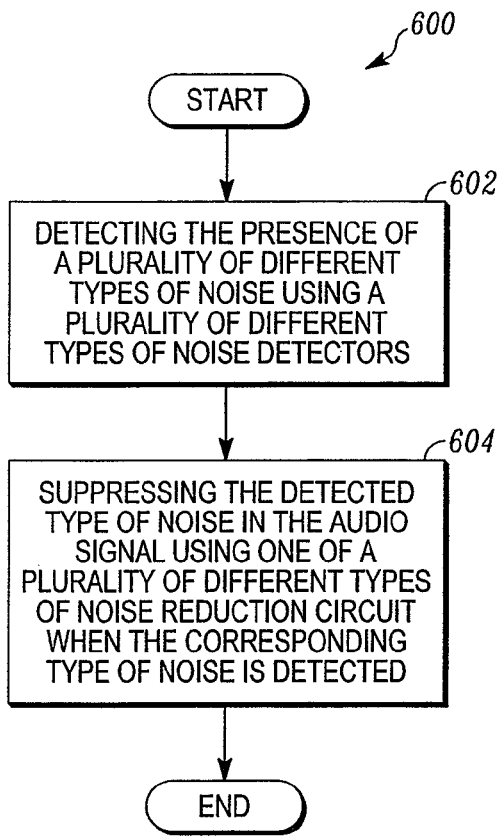
FIG. 6 is a method for suppressing noise in an audio signal, in accordance with at least one embodiment of the present invention.

FIG. 6 illustrates a method 600 for suppressing noise in an audio signal, in accordance with at least one embodiment of the present invention. The method includes detecting 602 the presence of a plurality of different types of noise using a plurality of different types of noise detectors. The detected type of noise in the audio signal is then suppressed 604 using one of a plurality of different types of noise reduction circuits, when the corresponding type of noise is detected.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A noise suppression circuit for use in an audio signal processing circuit, the noise suppression circuit comprising:
a plurality of different types of noise activity detectors including a babble noise activity detector and a stationary noise activity detector, where each noise activity detector is adapted for detecting the presence of a different type of noise in a received signal; and
a plurality of different types of noise reduction circuits including a noise attenuation circuit and a noise subtraction circuit, where each noise reduction circuit is adapted for removing a different type of detected noise, where each noise reduction circuit respectively corresponds to one of the plurality of noise activity detectors with the noise attenuation circuit corresponding to the stationary noise detector and the noise subtraction circuit corresponding to the babble noise activity detector;

wherein when each one of the plurality of noise activity detectors detects the presence of a corresponding type of noise in the received signal, the respective noise reduction circuit is selectively activated to condition the received signal to reduce the amount of the detected types of noise, and wherein the noise attenuation circuit and the noise subtraction circuit are both activated when both the stationary noise activity detector and the babble noise activity detector detect the presence of the corresponding noise types for the stationary noise activity detector and the babble noise activity detector in the received signal.

2. A noise suppression circuit in accordance with claim 1, wherein the stationary noise activity detector includes a spectrum domain noise activity detector and a time domain noise activity detector.

3. A noise suppression circuit in accordance with claim 1, wherein the babble noise activity detector includes a gaussian mixture model.

4. A noise suppression circuit in accordance with claim 3, wherein the gaussian mixture model includes a speech model for detecting the presence of a desired voice signal, and a noise model for detecting the presence of babble noise.

5. A noise suppression circuit in accordance with claim 4, wherein the detected voice signal and the detected babble noise are used to formulate a signal to be used for a corresponding one of the noise reduction circuits.

6. A noise suppression circuit in accordance with claim 4, wherein the detected babble noise is used to update the noise model.

7. A noise suppression circuit in accordance with claim 1 further comprising a comfort noise source for producing a comfort noise signal, and a mixer for combining the comfort noise signal with the received signal, which has been conditioned to reduce the amount of the detected types of noise.

8. A noise suppression circuit in accordance with claim 1, wherein the noise suppression circuit is incorporated in a two way communication device including a microphone and a speaker.

9. A noise suppression circuit in accordance with claim 8 further comprising an echo cancellation circuit for receiving a signal to be reproduced by the speaker and removing any speaker reproduced signal detected by the microphone.

10. A noise suppression circuit in accordance with claim 1, wherein the noise suppression circuit is incorporated as part of a radio frequency telephone.

11. A two way communication device comprising: a transceiver for communicating with a remote radio source;
a speaker for reproducing an audio signal received from a remote radio source; a microphone for detecting an audio signal to be transmitted to the remote radio source; and
an audio signal processing circuit including a noise suppression circuit for conditioning the audio signal detected by the microphone prior to being transmitted to the remote radio source by the transceiver, the noise suppression circuit comprising
a plurality of different types of noise activity detectors including a babble noise activity detector and a stationary noise activity detector, where each noise activity detector is adapted for detecting the presence of a different type of noise in an audio signal detected by the microphone, and a plurality of different types of noise reduction circuits including a noise attenuation circuit and a noise subtraction circuit, where each noise reduction circuit is adapted for removing a different type of detected noise, where each noise reduction circuit respectively corresponds to one of the plurality of noise activity detectors with the noise attenuation circuit corresponding to the stationary noise detector and the noise subtraction circuit corresponding to the babble noise activity detector;

wherein when each one of the plurality of noise activity detectors detects the presence of a corresponding type of noise in the audio signal detected by the microphone, the respective noise reduction circuit is selectively activated to condition the audio signal detected by the microphone to reduce the amount of the detected types of noise, and wherein the noise attenuation circuit and the noise subtraction circuit are both activated when both the stationary noise activity detector and the babble noise activity detector detect the presence of the corresponding noise types for the stationary noise activity detector and the babble noise activity detector in the audio signal.

12. A two way communication device in accordance with claim 11 wherein the noise suppression circuit further comprises a comfort noise source for producing a comfort noise signal, and a mixer for combining the comfort noise signal with the audio signal detected by the microphone, which has been conditioned to reduce the amount of the detected types of noise.

13. A two way communication device in accordance with claim 11 the noise suppression circuit further comprises an echo cancellation circuit for receiving the audio signal received from the remote radio source to be reproduced by the speaker and removing any speaker reproduced signal detected by the microphone.

14. A method for suppressing noise in an audio signal, the method comprising:
detecting with a plurality of different types of noise activity detectors including a babble noise activity detector and a stationary noise activity detector the presence of a plurality of different types of noise in the audio signal, each different type of noise activity detector being adapted to detect a different type of noise;
suppressing the detected type of noise in the audio signal using one of a plurality of different types of noise reduction circuits including a noise attenuation circuit and a noise subtraction circuit, where each noise reduction circuit is adapted for removing a different type of detected noise, where each noise reduction circuit respectively corresponds to one of the plurality of noise activity detectors with the noise attenuation circuit corresponding to the stationary noise detector and the noise subtraction circuit corresponding to the babble noise activity detector, when the respective detector detects the presence of the corresponding type of noise by selectively activating the respective noise reduction circuit, and wherein the noise attenuation circuit and the noise subtraction circuit are both activated when both the stationary noise activity detector and the babble noise activity detector detect the presence of the corresponding noise types for the stationary noise activity detector and the babble noise activity detector in the audio signal.

* * * * *